United States Patent Office 3,367,256
Patented Feb. 6, 1968

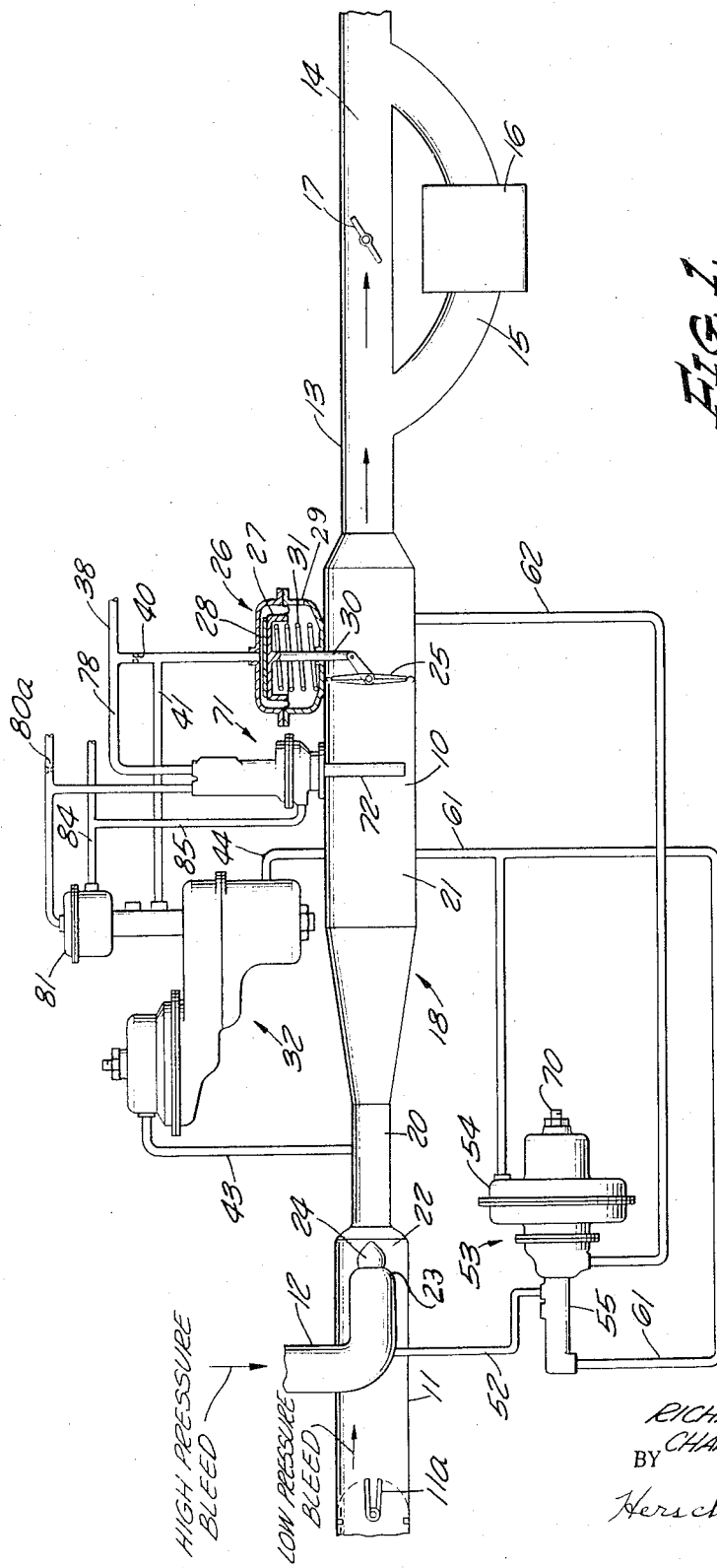

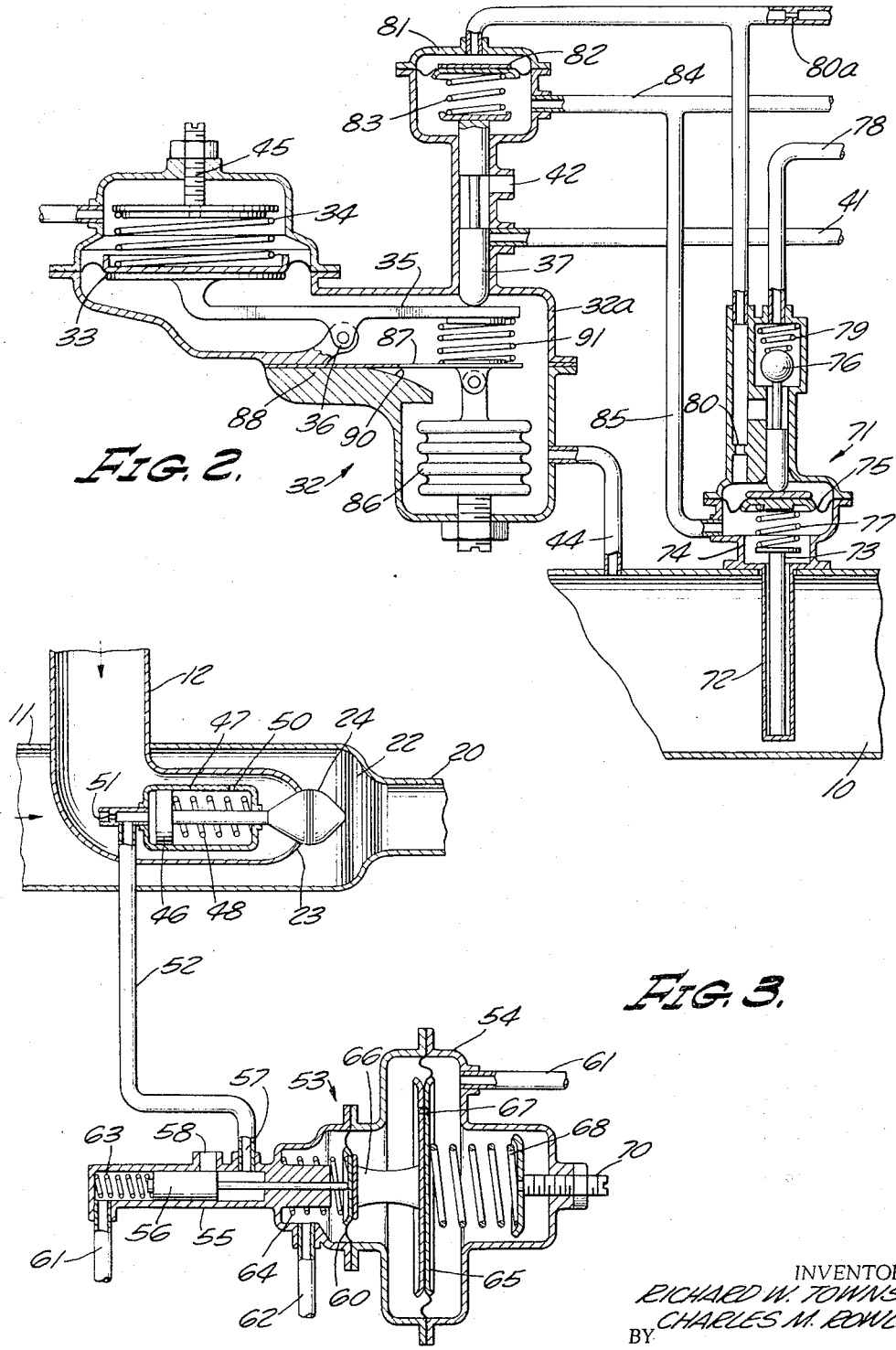

3,367,256
CABIN AIR FLOW CONTROL SYSTEM
Richard W. Townsend, Scottsdale, and Charles M. Rowland, Phoenix, Ariz., assignors to The Garrett Corporation, Los Angeles, Calif., a corporation of California
Filed Feb. 15, 1966, Ser. No. 527,606
17 Claims. (Cl. 98—1.5)

This invention relates generally to environmental control systems, and is more particularly directed to apparatus and systems for controlling the flow of air under pressure from a plurality of sources thereof to an enclosure such as an aircraft cabin. Still more particularly, the invention is directed to a system for governing the flow of air from two or more portions of the aircraft engine or engines to the cabin whereby the most optimum pressures, temperatures, and flow rates will be secured with the utmost efficiency.

One of the primary objects of the invention is to provide a system for controlling the flow of air to an enclosure from a plurality of sources of different pressures, such as high- and low-pressure stages of the compressor of an aircraft engine whereby air from the lower pressure source, which obviously is the most economical air to produce, will be used to supply the enclosure during the major portion of the time, air from the higher pressure source being employed only during the periods when the supply from the lower pressure source is insufficient to meet the demands, the higher pressure air being used in a particular manner to augment or boost the flow of air from the lower pressure source even though the engine is operating at a reduced capacity.

Another object of the invention is to provide a system for controlling the flow of air to an enclosure from a plurality of sources at different pressures, such system having an ejector means which utilizes air from the higher pressure source to induce a flow of air from the lower pressure source when the pressure therein falls, the system also having valve means and actuating mechanism therefor which is responsive to pressure and flow conditions in selected portions of the system to automatically control the flow from the different sources and secure the most efficiency consistent with the demands.

Still another object of the invention is to provide an air flow control system having a main duct with inlet branches communicating with sources of air under different pressures and an outlet branch leading to an enclosure, the system also having an ejector mechanism at the juncture of the inlet branches and the main duct, valve means for controlling the flow of air from the different sources, and a Venturi section in the main duct for generating control signals in response to flow therethrough, the signals controlling the operation of the valve means.

A further object of the invention is to provide the system mentioned in the preceding paragraph with fluid pressure responsive actuating means for the flow controlling valve means, and servo-metering type valve means for governing the application of fluid pressure to the actuating means, means for sensing pressure differentials in the main duct at spaced portions of the Venturi section being utilized to provide the signals which control the operation of the servo-metering valve means.

A still further object is to provide the system mentioned in the two preceding paragraphs with means for automatically adjusting predetermined parts of the servo-metering valve means to compensate for variations in either or both pressure and temperature of the air flowing through the main duct, whereby the weight flow of air required to assure the comfort of the occupants of the enclosure will be secured.

Another object of the invention is to provide the air flow control system mentioned in the three preceding paragraphs with means for anticipating changes in the air pressure sources which might undesirably affect the operation of the system, and adjusting the valve operating mechanism to compensate for such changes and prevent system operation from being affected.

Stated more specifically, it is an object of this invention to provide an air flow control system having a main duct with inlet branches communicating with high- and low-pressure stages of an aircraft engine, an outlet communicating with the aircraft cabin both directly and through an air cooling system, a Venturi section intermediate the inlets and outlet, an ejector means at the inlet of the Venturi section to utilize fluid from the higher pressure stage to boost flow from the low-pressure stage, and fluid pressure responsive valve means for controlling fluid flow from the different stages, means also being provided to control the operation of the fluid pressure responsive valve means in response to the pressure differential across the Venturi section and to compensate for pressure and temperature variations in the fluid flowing through predetermined parts of the duct to maintain the desired weight flow of air at all times during the operation of the system.

The foregoing objects and advantages, as well as others which will become obvious, may be attained through the use of a system embodying the invention shown in the accompanying drawings and explained in detail in the following description.

In the drawings:
FIG. 1 is a schematic view of a flow control system in which features of the invention have been incorporated;
FIG. 2 is a detail view of a flow sensing and servo-metering valve assembly used in the system of FIG. 1; and
FIG. 3 is a similar view of a combination valve and ejector with fluid pressure responsive control mechanism incorporated in the system shown in FIG. 1.

A closer inspection of FIG. 1 will show that the system includes a main duct 10 having inlet branches 11 and 12 and an outlet 13, this outlet having one portion 14 extending directly to the cabin or other enclosure. A bypass portion 15 is also provided, this bypass portion including an air cooling apparatus 16 which may be of any suitable type and would offer considerable resistance to the air flow. This bypass also connects at its outlet end with the cabin. The branch 14 may contain a suitable flow control valve 17 to govern the quantity of air flowing therethrough and to make air flow through the branch 15.

The inlet branches of the main duct are formed for communication with sources of fluid under different pressures, an example of such sources being a bleed port from a high-pressure stage of the aircraft engine which would be connected to branch 12, and a bleed port from a low-pressure stage which would be connected with branch 11. As pointed out in the objects, it is desirable to utilize low-pressure air as much as possible to conserve fuel.

The main duct 10 also includes a section in the form of a Venturi 18, this section having a reduced throat portion 20 and an outlet end 21. The walls of the Venturi diverge from the throat to the outlet end.

The system is also provided with an ejector at the inlet end of the Venturi section 22. The ejector includes a nozzle 23 which receives air from the inlet branch 12 and discharges such air axially into the inlet end of the Venturi section. In the form of the invention illustrated, the nozzle 23 has a plug valve 24 for controlling the flow of fluid from the nozzle.

As shown in FIG. 1, the main duct is also provided with a control valve 25 which, in this instance, is of the butterfly type having a fluid pressure responsive actuator 26. This actuator may be of the type illustrated or other suitable movable wall type. The actuator illustrated in FIG. 1 has a diaphragm 27 which is peripherally clamped by housing portions, reinforcing plates 28 being secured to the center portion of the diaphragm and having an actuating stem 30 extending therefrom to a lever arm connected with the butterfly valve 25. A coil spring 31 is disposed between the plate assembly 28 on the diaphragm and the housing to urge the diaphragm in a valve closing direction.

The butterfly valve is shown in the closed position in FIG. 1. This butterfly valve functions as a flow control element in the main duct of the system. To control the operation of the flow control valve, a flow sensing and servo-metering valve assembly, designated generally by the numeral 32, has been provided. Reference to FIG. 2 shows that this assembly includes a housing 32a and diaphragm 33, spring means 34 for urging the diaphragm in one direction, and a lever 35 which is pivoted in the housing as at 36, the lever transmitting movement of the diaphragm to a spool valve 37 which controls the application of fluid pressure to the actuator 26 (see FIG. 1) of valve 25. Fluid from a regulated supply (not shown) is conducted to the actuator 26 through a duct 38 which contains a restriction 40. The duct has a branch 41 leading therefrom between the restriction 40 and the actuator to the housing 32a at the portion containing the spool valve 37. This housing 32a also has an outlet 42, flow from the branch 41 to the outlet being controlled by the valve 37. When the valve is in position to interrupt such flow, fluid pressure will be applied through passage 38 to the actuator 26 and will cause diaphragm 27 to move in opposition to the force of spring 31 to open butterfly valve 25. When valve 25 is open, fluid may flow through the main duct to the cabin or other enclosure. Under ordinary conditions of operation of the aircraft engine, the source of this fluid would be air from a low-pressure stage.

The mass flow of air through the main duct is controlled by the butterfly valve 25 in response to signals applied to the assembly 32. These signals are generated by flow through the Venturi and constitute the static pressures at the throat and outlet of the Venturi. They are transmitted through passages 43 and 44, leading, respectively, from the throat and outlet of the Venturi to the housing 32a. Passage 43 extends to the housing on one side of the diaphragm 33, while passage 44 communicates with the housing at the opposite side of such diaphragm.

As is well known in the art, flow through a Venturi causes a reduced static pressure at the throat and an increased or higher static pressure at the outlet. The diaphragm 33 will therefore be exposed to a pressure differential existing across the Venturi. Diaphragm 33 is urged toward the higher pressure side by the spring 34, the force of this spring being variable for calibration of the control through the adjustment of screw 45. The diaphragm will seek and come to rest in a position of equilibrium when the total forces of pressure and spring 34 on the one side balance the force of the pressure on the other side. When the pressure differential varies, diaphragm 33 will be repositioned by the pressure and/or spring 34 in response thereto. This repositioning movement will be transmitted by the lever 35 to the valve 37 to control the bleeding of pressure from the pressure side of the actuator diaphragm 27. Sufficient bleeding of the fluid pressure will permit diaphragm 27 to move under the influence of spring 31 to adjust or modulate the butterfly valve 25. The side of diaphragm 27 exposed to spring pressure is exposed to ambient pressure through an opening 29 in the actuator housing.

It will be obvious from the foregoing that air flow through the main duct will cause a pressure differential across the Venturi, and the application of this pressure differential to the flow sensor diaphragm 33 will cause the servo-metering valve 37 to control the application of force to the flow control valve actuator 27 whereby the valve 25 will govern the flow of air to the aircraft cabin. In the event engine operating conditions cause a reduction of air produced in the low-pressure stage below a predetermined minimum, it is necessary to supply air to the main duct from another source. The source selected, as previously pointed out, is a higher pressure stage of the engine. To admit air from such higher pressure stage, valve 24 (see FIGS. 1 and 3) must be moved to an open position. To effect such movement, valve 24 is provided with an actuating mechanism consisting of a piston 46 which is disposed in a cylinder 47 having restricted openings 50 and 51 to admit fluid pressure to both sides of the piston. Piston 46 is urged in a valve closing direction by a spring 48 also disposed in the cylinder 47. Inlet opening 50 admits air from the high-pressure stage to one side of the piston 46 to also urge this piston in a valve closing direction.

The valve 24, as illustrated, has an area which is exposed to the air from the high-pressure stage, the force of the air tending to move the valve in an opening direction. This area is equal to the area of the piston exposed to closing fluid pressure so that forces applied by the air to such areas will be balanced and under such a condition the valve will be maintained in a closed position by the force of spring 48 when no other forces are applied.

The second reduced opening 51 in the cylinder 47 will admit air from the high-pressure source to the side of the piston opposite that engaged by the spring. To vent this pressure so that opposed surfaces of the valve and piston can be balanced as mentioned above, a passage 52 leads from the cylinder 47, at a point between the reduced opening 51 and the piston, to a differential pressure sensor and differentiator assembly, indicated generally by the numeral 53. This assembly assists in the control of the operation of the ejector valve 24. The assembly 53 includes a housing 54 having a valve section 55 for receiving a spool valve 56. The valve section 55 has an inlet 57 with which the passage 52 communicates. It also has an outlet 58 leading to the ambient atmosphere. Valve 56 controls the flow of fluid from cylinder 47 between the inlet orifice 51 and piston 46, through passage 52, inlet 57, and outlet 58, to the atmosphere. Under normal conditions of operation, valve 56 is in a position to permit such flow. When valve 56 is in position to prevent such flow, however, fluid pressure will be applied by air from the high-pressure source to piston 46 to move valve 24 in an opening direction in opposition to the force of spring 48. Air from the high-pressure stage may then flow from the nozzle 23 into the inlet of the Venturi section to supplement air flow from the low-pressure stage. The flow of high-pressure air in this manner also induces a flow of air from the low-pressure stage due to the ejector action which creates a reduced pressure in the inlet branch around the nozzle 23. The flow of low-pressure air into the cabin is thus boosted by the admission of air from the high-pressure source.

Operation of spool valve 56 is governed by the differential pressure sensor 53 which, as illustrated, includes a diaphragm 60. This member is exposed to the pressure differential existing between the upstream and downstream sides of the butterfly valve 25. Such pressure differential is sensed by a pair of passages 61 and 62 leading from the main duct at the upstream and downstream sides, respectively, of the butterfly valve 25. Passage 61 communicates with housing 54 and pressure sensed by this passage is applied to one side of the diaphragm 60 through a restriction 67 formed in a second diaphragm 65 in housing 54, while passage 62 communicates with the housing at the other side of diaphragm 60. It will be apparent that the higher pressure of the differential across valve 25 will be applied to diaphragm 60 through passage 61 and orifice 67 to cause it to move spool valve 56 toward an open position or a position in which fluid pressure, which tends to move the ejector valve toward the open position, will be bled to the atmosphere. Valve 24 will therefore normally occupy a closed position. When, however, the lower pressure from the low-pressure stage is marginal, valve 24 will be opened to permit flow from the high-pressure stage to augment flow from the low-pressure stage. The flow of air from the high-pressure bleed to the low-pressure bleed when the low-pressure source becomes totally inadequate, even with the assistance of the ejector, is prevented by providing inlet branch 11 with a check valve 11a. This check valve will close when pressures at the upstream and downstream sides thereof are substantially equal.

A small spring 63 is provided in the valve portion of housing 54 to normally urge spool valve 56 toward a closed position. Another spring 64 also in the housing urges diaphragm 60 in a direction to permit valve 56 to close. Spring 64 opposes fluid pressure applied to the diaphragm 60 through passage 61.

In some instances it may be desirable to anticipate sudden changes in operation of the engine which would cause rapid pressure changes in the air flow system. To this end the assembly 53 is provided with the second diaphragm 65 which is disposed in the housing 54 and is connected with diaphragm 60 by rod 66. Diaphragm 65 has the reduced opening 67 therein which permits restricted flow from passage 61 through the diaphragm for application to diaphragm 60. When sudden pressure changes occur in the system, orifice 67 cannot accommodate the flow, and diaphragm 65, together with diaphragm 60, will be moved to actuate valve 56 to open or closed position, depending upon the pressure change. This movement will vary the force applied to piston 46 to cause valve 24 to admit or interrupt flow from the high-pressure stage and thus compensate for the change. It will be obvious that orifice 67 will restrict fluid flow in either direction therethrough, and diaphragm 65 will move upon sudden changes in pressure but will be relatively unaffected by slow changes in pressure. Diaphragm 65 is urged in a direction to move valve 56 toward an open position by a spring 68. The force of this spring may be adjusted by screw 70.

It will be obvious from the foregoing that flow control valve 25 is operated in response to changes in the pressure differential existing between the throat and the outlet of the Venturi section of the main duct. The movement of flow control valve 25 in turn changes the pressure differential existing in the main duct between the upstream and downstream sides of valve 25. These changes in this pressure differential in turn control the operation of the ejector valve. The flow from the high-pressure spool is thus controlled, in part, by the pressure differential across the Venturi section.

To secure required ventilation rates and noise levels, it is necessary in systems for supplying air to the cabin of an aircraft to maintain a relatively constant predetermined mass flow. Obviously, the temperature within the aircraft cabin may vary, and to maintain the desirable conditions, air supplied to the cabin will have to be cooled, inasmuch as air from the engine compressors will be relatively warm. It will also be obvious that in certain instances it may be necessary to vary the volume of heated air admitted to the cabin to maintain desirable temperatures. These requirements are satisfied by providing the system with the duct construction and mechanism indicated by the numerals 14–17, inclusive. When the air flow is directed through the air cooling mechanism 16, more resistance to air flow will be encountered and pressure in the main duct will increase. As valve 17 is adjusted to permit a more direct flow of air, the pressure will decrease. The mass flow will therefore be subject to changes in either pressure or temperature. It is therefore necessary to provide the control mechanism with means for compensating for changes in temperature and/or pressure to maintain the required mass flow. The mechanism illustrated herein has such means. The means for compensating for temperature change, designated generally by the numeral 71, includes a bimetallic thermal element 72 disposed in the main duct at the upstream side of the flow control valve 25. The element 72 has an actuating plunger 73 which projects exteriorly of the main duct into the casing 74 of the temperature compensator 71. This casing is divided into sections by a diaphragm 75 which is provided to actuate a valve 76 in response to forces applied by fluid pressure and the actuating plunger 73. Motion on the part of the actuating plunger 73 in response to temperature change is transmitted to the diaphragm 75 through a spring 77. One side of diaphragm 75 is exposed to fluid pressure from the regulated supply source through a passage 78 connected with passage 38 and leading to the casing 74. Flow of this fluid is controlled by the valve 76. Under normal conditions this valve is urged toward a closed position by a spring 79 so that fluid flow to the diaphragm will be obstructed. When the valve is open, however, fluid may flow past the valve and through a restricted passage 80 to the section of the casing 74 at the opposite side of diaphragm 85 from that occupied by the spring 77. Passage 80 also communicates with an enlargement 81 on the housing 32a of the flow sensor and servo-metering valve assembly 32. Enlargement 81 is formed on the portion of the housing which receives valve 37. Section 81 is hollow and is provided with a diaphragm 82.

A spring 83 is disposed between the diaphragm and one end of the spool valve 37. It will be apparent that when fluid under pressure is applied through passage 80 to the surface of diaphragm 82, this diaphragm will be moved toward spool 37, and force from the diaphragm will be transmitted through spring 83 to the valve to bias it toward an open position. The side of the diaphragm 82 exposed to the force of spring 83 is also exposed to fluid at the pressure existing in the aircraft cabin. This fluid is introduced through passage 84. A branch 85 of this passage extends to the space in casing 74 at the side of diaphragm 75 occupied by spring 77 and opposes force applied by the regulated pressure introduced through passages 78 and 80. Diaphragm 75 is therefore exposed to cabin pressure to be influenced thereby. A restricted outlet 80a leads from passage 80 to the atmosphere to permit fluid to bleed from the space above diaphragm 82 when valve 76 is closed.

It will be apparent from the foregoing that when the temperature of air flowing through the main duct varies, the bimetallic element 72 will respond to transmit force to the diaphragm 75, which in turn will move valve 76 to govern the flow of fluid under pressure to the diaphragm 82. Valve 37 will thus be biased in response to temperature change.

To compensate for pressure change in the main duct, housing 32a is provided with an evacuated bellows 86, one end of this bellows being secured to the housing and the other end being secured to a flat leaf spring 87 which is anchored at one end to the housing as at 88. This spring is arranged to engage a curved surface 90 in the housing when the spring is moved in one direction to progressively change the force of the spring and thus give the spring a variable rate which will produce a nonlinear force with respect to the sensed inlet pressure. The movement of spring 87 is transmitted through a constant rate coil spring 91 to lever 35 for transmission by this lever to the diaphragm 33. It will be clear that when the lever is loaded in this manner by bellows 86, increased force will be required to be applied to the diaphragm 33 to effect movement of the lever 35. The flow sensing and servo-metering valve assembly is thus influenced by, or compensates for, changes in pressure and temperature of the fluid flowing through the main duct and the required weight flow of air will be maintained.

We claim:

1. A system for controlling air flow from a plurality of sources at different pressures to an enclosure comprising:

(a) a main duct with a plurality of inlets communicating with the plurality of sources and an outlet communicating with the enclosure, said main duct having a Venturi section;

(b) ejector means positioned within said main duct at the inlet to said Venturi section, said ejector means including a nozzle and being provided to utilize air from the higher pressure source to augment air flow from a lower pressure source; and (c) valve means responsive in part to variations in the pressure differential between the throat and outlet of the Venturi to control flow of air from the higher pressure source through said ejector means.

2. The air flow control system of claim 1 in which the valve means is constructed to normally control air flow from the lower pressure source and to admit air from the higher pressure source when the pressure of the lower pressure source falls below a predetermined minimum.

3. The air flow control system of claim 1 in which means are provided to sense the pressure differential between the throat and outlet of the Venturi section and respond to variations in such pressure differential to actuate said valve means to control flow of air from said pressure sources through said main duct.

4. The air flow control system of claim 1 in which said valve means includes fluid pressure responsive actuators, and means responsive to variations in the pressure differential between the throat and outlet of the Venturi section of said main duct to control the application of fluid pressure from a suitable source to said fluid pressure responsive actuators.

5. The air flow control system of claim 1 in which said valve means includes first and second parts, the first part normally operating to control air from the low pressure source and tending to open fully when the pressure in the low pressure source is reduced a predetermined amount, the second part being operated to admit air from the higher pressure source when the first part approaches a fully open condition.

6. The air flow control system of claim 4 in which a part of said valve means is disposed adjacent the ejector and is operated to admit air from the higher pressure source when the flow of air from the lower pressure source is diminished below a predetermined volume.

7. The air flow control system of claim 1 in which means responsive to temperature variations in said main duct downstream of said Venturi section are provided to change the operation of said valve means to tend to maintain a predetermined flow to the enclosure.

8. The air flow control system of claim 4 in which means are provided to vary the operation of the valve actuating means to compensate for pressure variations in the main duct at the outlet end of said Venturi section.

9. The air flow control system of claim 4 in which means are provided to vary the operation of the valve actuating means to compensate for both pressure and temperature variations in the main duct at the outlet end of said Venturi section.

10. The air flow control system of claim 1 in which said valve means includes a fluid pressure responsive actuator, a servo-metering valve for controlling the application of fluid pressure from a suitable source to said fluid pressure responsive actuator, and means for sensing variations in the pressure differential between the throat and outlet of said Venturi section and effecting the operation of said servo-metering valve in response thereto.

11. The air flow control system of claim 1 in which said valve means includes a fluid pressure responsive actuator, means for applying fluid pressure from a suitable source thereof to said actuator, a servo-metering valve for controlling the application of fluid pressure to said actuator by bleeding fluid pressure from said fluid pressure applying means, and means responsive to variations in the pressure differential between the throat and outlet of the Venturi section for actuating said servo-metering valve.

12. The air flow control system of claim 1 in which said valve means includes first and second parts, the first part being located downstream of said Venturi and operative to control flow through said main duct, the second part being located adjacent said ejector means and operative after said first part has reached a predetermined stage of operation.

13. The air flow control system of claim 12 in which said first and second parts of said valve means have fluid pressure responsive actuators, the actuator for the first part being responsive to variations in the pressure differential between the throat and outlet of said Venturi section, the actuator for the second part being responsive to variations in the pressure differential between the upstream and downstream sides of said first valve part.

14. The air flow control system of claim 11 in which means are provided to anticipate sudden system pressure changes and compensate therefor by controlling the rate of response of said actuator.

15. The air flow control system of claim 1 in which the valve means includes a flow control valve in said main duct downstream from said Venturi section and responsive to the pressure differential between the throat and outlet of said Venturi section, and valve means in communication with said ejector means, the last-named valve means being responsive to pressure differentials between the upstream and downstream sides of said flow control valve.

16. The air flow control system of claim 15 in which said last-named valve means has fluid pressure responsive control means with means for sensing and compensating for sudden system pressure changes.

17. The air flow control system of claim 16 in which the means for sensing and compensating for sudden system pressure changes includes a movable wall and restricted passage means establishing controlled communication between the spaces at opposite sides of said wall.

References Cited
UNITED STATES PATENTS

| | | | |
|---|---|---|---|
| 2,723,615 | 11/1955 | Morris | 98—1.5 |
| 2,734,356 | 2/1956 | Kleinhans | 98—1.5 XR |
| 3,192,848 | 7/1965 | Townsend | 98—1.5 |

MEYER PERLIN, *Primary Examiner.*